United States Patent [19]

Quante et al.

[11] Patent Number: 4,727,786
[45] Date of Patent: Mar. 1, 1988

[54] SCRAP CUTTER

[75] Inventors: Siegfried Quante, Düsseldorf; Gabriele Greiner, Mönchengladbach, both of Fed. Rep. of Germany

[73] Assignee: Lindemann Maschinenfabrik GmbH, Düsseldorf, Fed. Rep. of Germany

[21] Appl. No.: 790,354

[22] Filed: Oct. 23, 1985

[30] Foreign Application Priority Data

Oct. 25, 1984 [DE] Fed. Rep. of Germany ....... 3439002

[51] Int. Cl.⁴ .......................... B26D 1/08; B30B 9/32; B30B 15/08
[52] U.S. Cl. .................................. 83/404.2; 83/636; 83/923; 100/95
[58] Field of Search .............. 83/278, 407, 404, 404.1, 83/404.2, 404.3, 404.4, 694, 636, 698–700, 923, 431, 564, 566; 100/95, 96, 98 R

[56] References Cited

U.S. PATENT DOCUMENTS

| | | | |
|---|---|---|---|
| 3,183,756 | 5/1965 | Dehn | 83/636 X |
| 3,945,315 | 3/1976 | Dahlem et al. | 100/95 |
| 4,018,169 | 4/1977 | Schmulz | 100/98 R X |
| 4,062,281 | 12/1977 | Tripp | 100/95 X |
| 4,498,380 | 2/1985 | Maus | 100/98 R |

FOREIGN PATENT DOCUMENTS 2456169 6/1977 Fed. Rep. of Germany.

Primary Examiner—E. R. Kazenske
Assistant Examiner—Hien H. Phan
Attorney, Agent, or Firm—Toren, McGeady & Associates

[57] ABSTRACT

In a cutter for small- and large-sized scrap material, first knives are located at one end of a feed trough cutting the scrap material pushed through the trough toward the first knives. A cover at least partially covers the feed trough. A side wall of the feed trough forms a pressure ram displaceable transversely across the feed trough. Cooperating second knives extend along the cover and the pressure ram and are arranged to cut the large sized scrap material so that it fits in the feed trough. One of the second knives can be positioned obliquely of the other for performing a progressive cutting of the scrap material.

14 Claims, 11 Drawing Figures

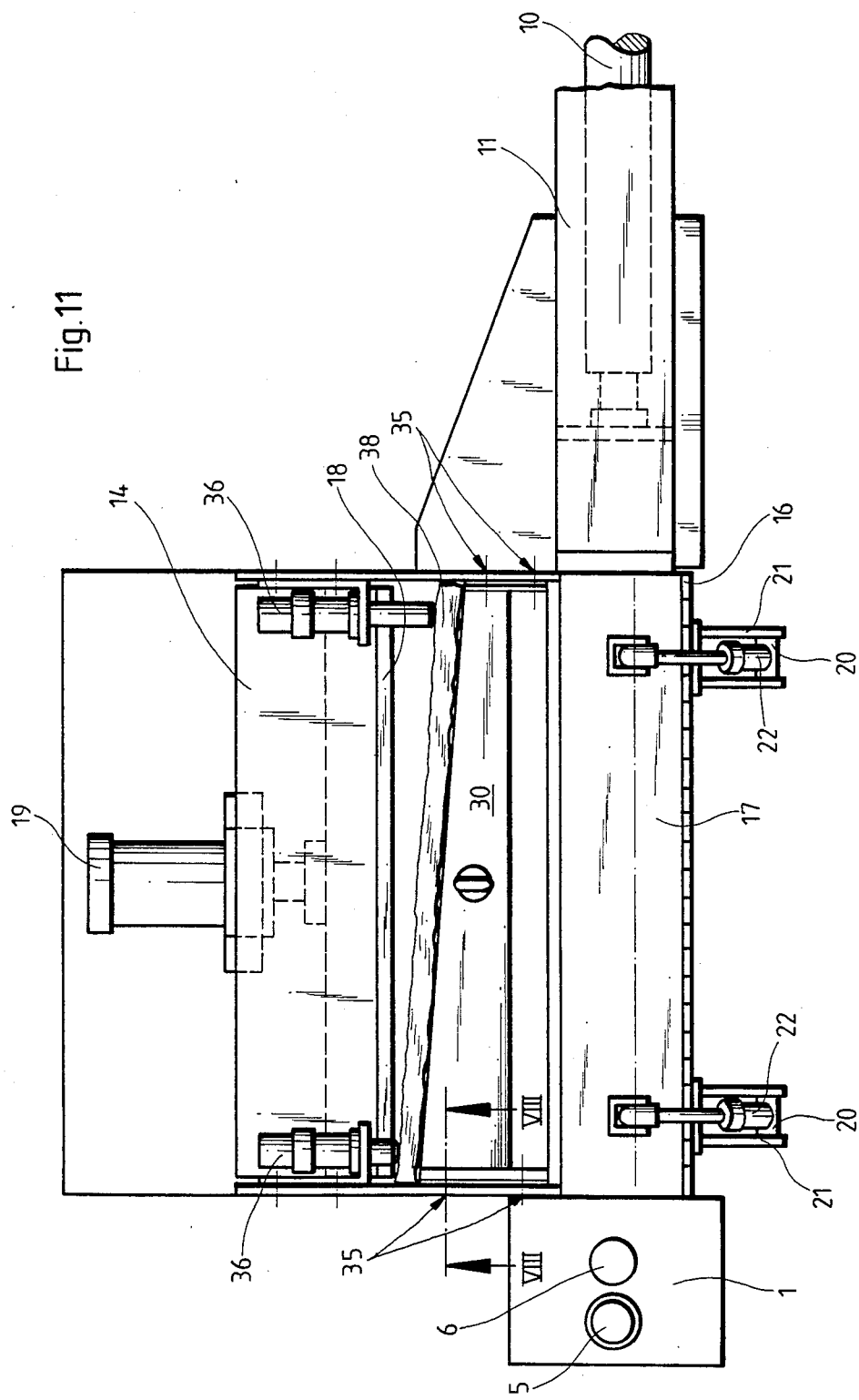

SCRAP CUTTER

BACKGROUND OF THE INVENTION

The present invention is directed to a scrap cutter with a feed trough arranged to direct scrap material to cutting knives. The feed trough is arranged to collect and compact the scrap material to be cut and includes an elongated wall forming a side pressure ram in the trough and a cover partially covers the trough.

In the use of scrap shears of the above-mentioned type, there has been a longstanding problem that the scrap material is supplied in a wide range of sizes. In actual use, the scrap material includes smaller pieces of collected scrap and, in addition, bulky or large-sized scrap material with large surfaces, such as pieces obtained when breaking up a ship's hull. As a result, conventional scrap cutters are designed either for small-sized or large-sized scrap material so that the feed trough and cutter opening are adapted to the size of the scrap material being handled.

Cutters for small-sized scrap material normally operated with pre-compaction, that is, scrap is loosely fed into the feed trough and is compacted initially by the trough cover with the possible addition of a side pressure ram extending along the trough for forming a more or less compact mass of the scrap material. Then, with the aid of a conveying ram displaceable in the long direction of the trough, the mass of scrap material is moved stepwise into the cutter opening and is sheared into sections based on the length of each step. To process large-sized scrap material which does not fit into the feed trough, such scrap cutters are unsuitable because the side pressure ram used for the compaction cannot handle large-sized scrap material and, therefore, cannot compact it. As a result, the large-sized scrap material must first be cut up, such as by a flame cutter or the combination of a large-sized scrap cutter and a small-sized scrap cutter must be employed. Since the two different sized scrap materials are supplied in different amounts, it is not possible to attain the efficient use of such cutters.

Special apparatus used for cutting up ships is known combining a primary cutter for dividing the large-sized scrap into long narrow strips which fall into the feed trough of another cutter for further division of the scrap material. Such two-trough cutters operated satisfactorily and, in addition, permit the processing of small-sized scrap material in the second cutter or shears. Such an arrangement, however, is very uneconomical, because the primary cutter often remains unused.

In the German Auslegeschrift No. 24 56 169 is disclosed a cutter with cutting shears arranged along the longitudinal edge of the trough and also on the lower edge of a ram which covers the top of the trough. Offset alongside and above the trough there is a chamber for collecting and compacting the scrap material and an additional displaceable ram compacts the material introduced into this chamber. This compressed body of scrap material is then introduced into the lower trough where it is pushed into a cutter or shears opening. Since the body of scrap material directed into the lower trough may include protruding portions, the edges of the trough and the cooperating ram are provided with shear knives; however, such knives have nothing to do with the shearing operation carried out by the cutter and, therefore, are not explained in any further detail.

SUMMARY OF THE INVENTION

Therefore, the primary object of the present invention is to avoid the disadvantages mentioned above and, in particular, to provide a scrap cutter which can handle small-sized as well as large-sized scrap material, such as sections of a ship's hull, in particular, ship's bulkheads and, in addition, to provide compaction of the material moved to the shears.

In accordance with the present invention, the scrap cutter is provided with a first pair of knives or shears for small-sized scrap material and another pair of knives or shears for large-sized scrap material, with both pairs of shears associated with a single feed trough. More specifically, the present invention involves a scrap cutter of the previously described type where the trough cover or a separate cutter or knife carrier and the side pressure ram combine to form a large-sized scrap material cutter with one of the cutting members being obliquely displaceable relative to the other and preferably adjustable relative to the other. The large-sized scrap material cutters are utilized only to the extent that the large-sized scrap material is supplied. The cutter for the large-sized material directs the cut scrap material into the feed trough with the primary cutters or shearing knives arranged at one end of the feed trough. Usually the feed trough is supplied with small-sized scrap material and the two different types of scrap material may be introduced simultaneously into the trough.

Preferably, the cover for the trough is movable. Accordingly, the large-sized scrap material can be positioned by a crane between the knives appropriately dimensioned for shearing the large-sized scrap and can be cut to a size which fits within the feed trough. The cut large-sized scrap material collects in the opening in the feed trough and can be fed to the primary cutting knives located at one end of the feed trough by means of a conveying slide or ram displaceable in the long direction of the trough.

The trough cover can be pivotally supported about an axis extending parallel to the long direction or axis of the trough. As a result, the trough cover and the side pressure ram of the trough can be utilized for compacting the scrap within the trough as well as for cutting the large-sized scrap material without the need for providing an additional structure for carrying the large-sized scrap material cutters. Moreover, any sections of the large-sized scrap material projecting beyond the width of the trough which cannot be sheared off, can, with the aid of the cover and the displaceable side pressure ram, be pressed together so as to fit into the trough through alternate actuation of the cover and the ram.

The trough cover, however, can be supported to be horizontally displaceable for the purpose of large-sized scrap material. Alternatively, the large-sized scrap material cutter can be supported on a separate carrier so that it is located in the cutting position only when it is required to cut up the large-sized scrap material and otherwise it remains spaced from the cutting position.

If a separate cutter carrier is used, the carrier and the feed trough should include support elements for holding the cutter carrier in the cutting position. Preferably, the long side of the carrier facing away from the cutting edge is supported against the trough cover.

To effect a progressive cutting action where the cutting force or pressure does not act at the same time over the full length of the cutting knives, but rather progresses from one end to the other of the knives, the large-sized scrap material knives extend at an angle relative to one another, that is, one knife extends obliquely of the other. Accordingly, one of the large-sized scrap material shears or knives is adjustable, that is, the one knife can be supported at a pivot axis and connected with a pivot actuator so that the cutting angle between the knives can be adjusted based on the scrap material to be cut. On the other hand, the side pressure ram provided with a large-sized scrap material knife can be pivotally supported about an axis extending transversely of the cutting plane. In such an oblique position, the side pressure ram affords a progressive cutting action and in its regular position parallel to the long direction of the trough it can be used for compacting the scrap material within the trough.

Therefore, the adjustable large-sized scrap material cutter affords adjustment for the optimum cutting conditions in consideration of the character of the large-sized scrap material to be cut up. Moreover, with such an arrangement, it is possible to cut up very rigid large-sized scrap material with a high resistance without any problem and using the same shearing or driving force as for the small-sized scrap material.

Finally, the cutter can be equipped in the region of the large-sized scrap material knives with at least one clamping cylinder for the large-sized scrap material and the feed trough can be provided with a longitudinally displaceable conveyor slide.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in where there are illustrated and described preferred embodiments of the invention.

BRIEF DESCRIPTION OF THE DRAWING

In the drawing:

FIG. 11 is a plan view of the cutter illustrated in FIG. 9.

DETAILED DESCRIPTION OF THE INVENTION

Figure 1:
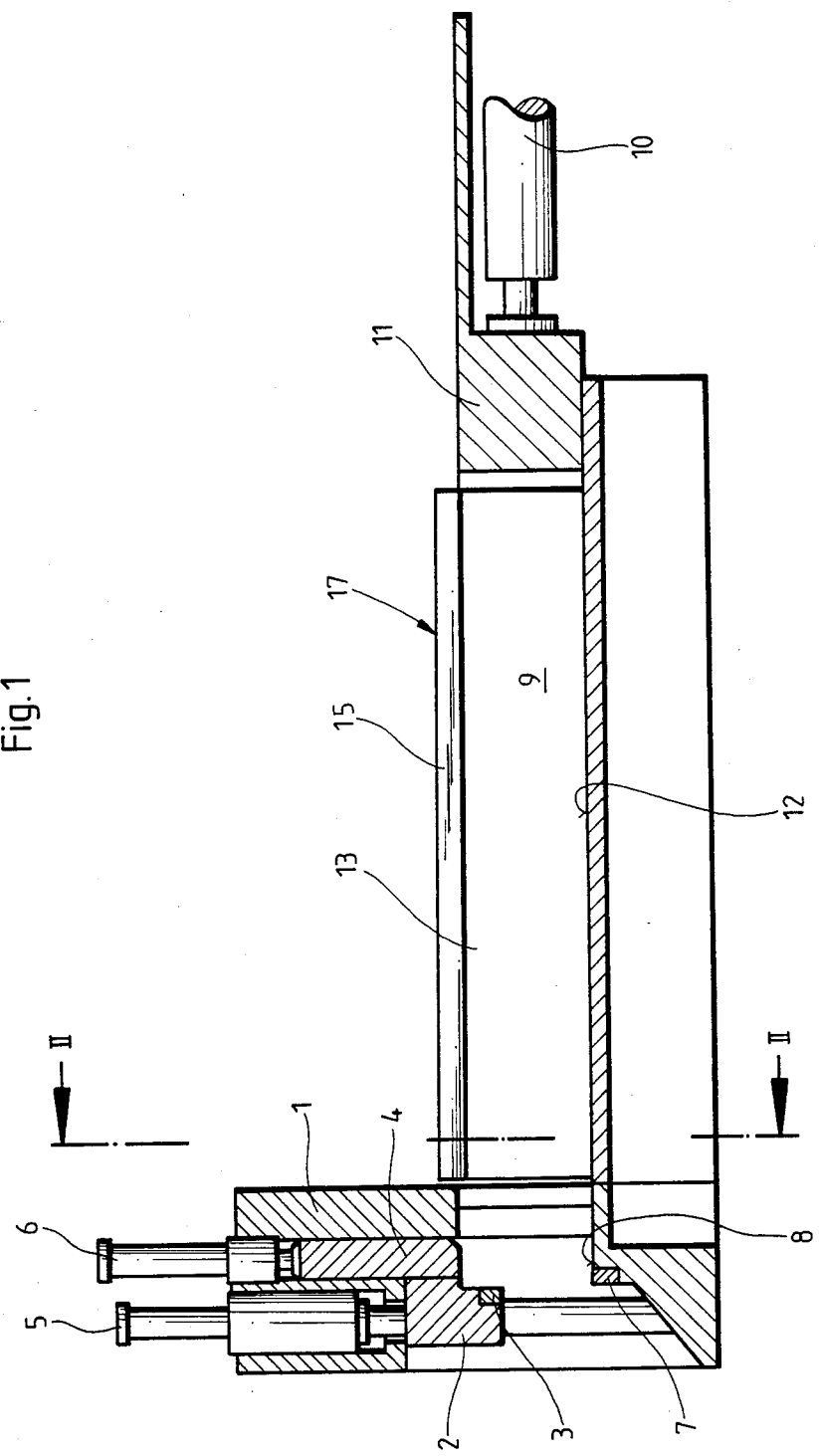
FIG. 1 is a cross-sectional view of a scrap cutter embodying the present invention and taken along the long direction of the feed trough for the cutter.
Figure 2:
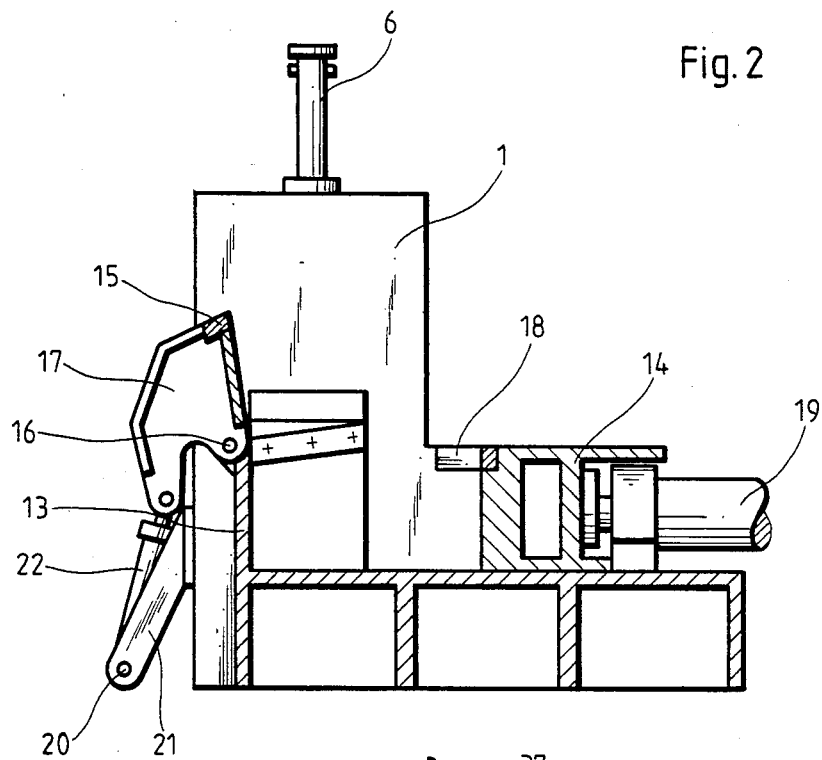
FIG. 2 is a cross-sectional view taken along the line II—II in FIG. 1.

A scrap material cutter or shears, as shown in FIGS. 1–6, includes a cutter stand 1 in the form of a tower, that is, an upwardly extending structure, with a carrier 2 for an upper movable knife 3 and a tamper or compressing member 4 located parallel to the carrier 2 and arranged upstream from the upper knife 3, that is, relative to the movement of the scrap material toward the knife. The compressing member 4 also serves as a restraining device for holding the scrap material. The carrier 2 and the compressing member 4 are vertically displaceable for carrying out the cutting or shearing operation. Double-acting hydraulic cylinder piston actuators 5, 6 are assigned to the upper knife carrier 2 and the compressing member 4, respectively. In the cutting operation, the movable upper knife 3 cooperates with a fixed lower knife 7. The knife 7 is located in a table 8 on which the scrap material rests as it is cut. On the table 8, the scrap material can be pressed vertically downwardly by the compressing member 4 or it can be held on the table 8 when the member 4 has been lowered. Extending transversely of the cutting plane of the knives 3, 7 is an elongated feed trough 9 in which the scrap material can be compacted. A conveying slide 11, movably displaceable by a double-acting horizontally extending hydraulic actuator 10, moves through the feed trough in the elongated direction thereof. The slide or ram 11 moves the scrap material introduced into the trough in a stepwise manner toward the knife opening at one end of the trough. The feed trough 9 is open at the top and is formed by a horizontally arranged fixed bottom 12, a vertically extending fixed side wall 13 extending in the long direction of the trough and an oppositely disposed, horizontally displaceable elongated side wall formed by a movable side press ram 14.

In the embodiment displayed in FIGS. 1–4, a large-sized scrap material knife 15 extends along an edge of a cover 17 which can be pivoted about an axis 16. The knife 15 cooperates in the cutting operation of the large-sized scrap material with knife 18 located along the edge of the side pressure ram 14 and extending obliquely of the knife 15. The movement of the side pressure ram 14 is provided by a double-acting hydraulic cylinder piston actuator 19 and the drive for pivoting the cover is afforded by a hydraulic cylinder piston actuator 22 supported at an articulation point 20 on an arm 21 secured to the stand 1. With the aid of the cover 17, large-sized scrap material which has been sheared off can be pressed vertically downwards toward the bottom 12 in the feed trough 9, if such material arches upwardly under the action of the conveyor slide or ram 11.

Figure 5:
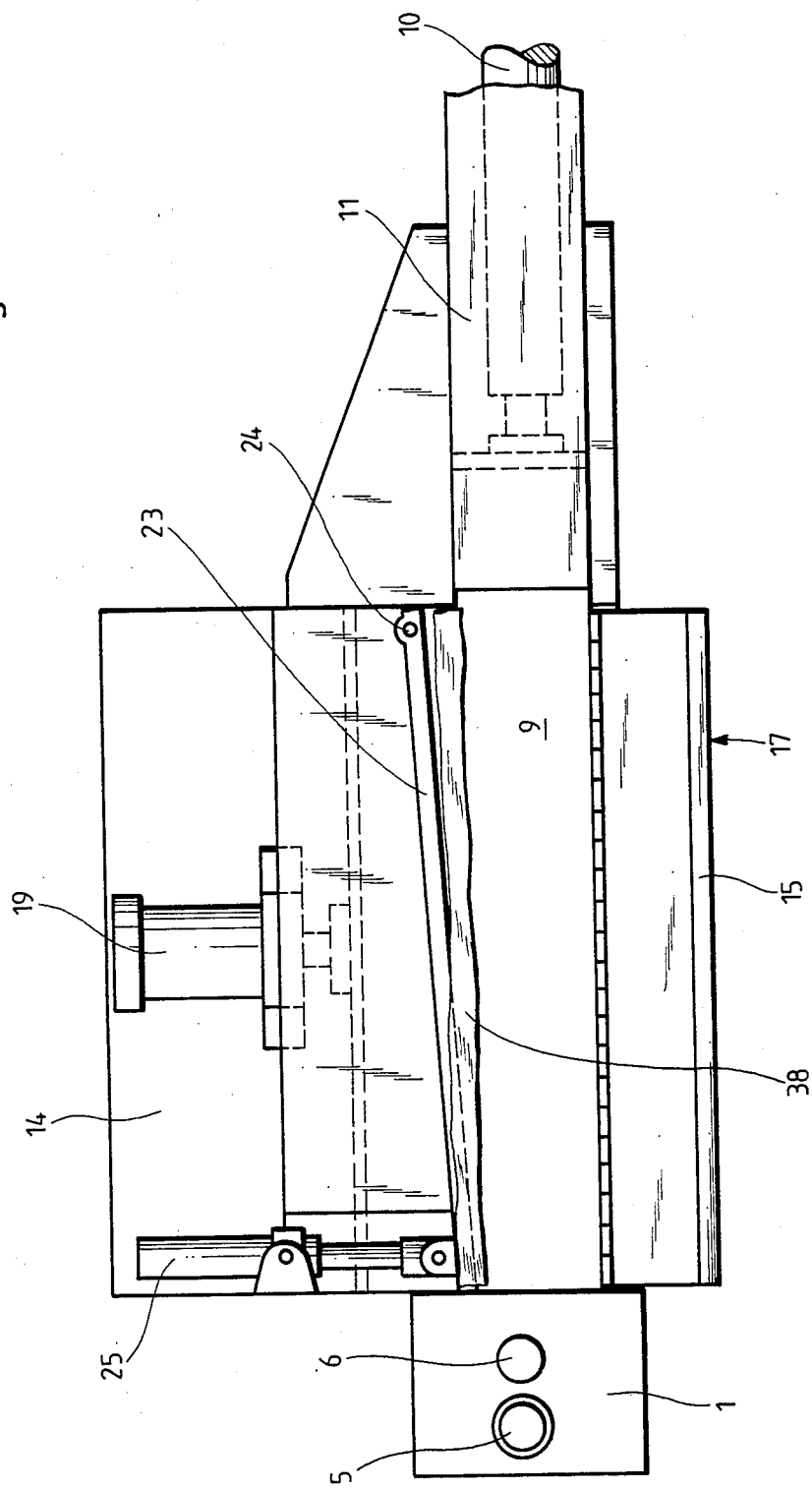
FIG. 5 is a plan view of the scrap cutter with an adjustable knife for cutting large-sized scrap material.

In the embodiment illustrated in FIG. 5, an adjustable large-sized scrap material knife 23 is located along the edge of the side pressure ram 14 and is supported at the end more remote from the stand 1 about a pivot axis 24 extending at right angles to the long direction of the knife. A pivot actuator 25 is provided at the opposite end of the knife 23 for pivoting the knife into the desired cutting position.

Figure 6:
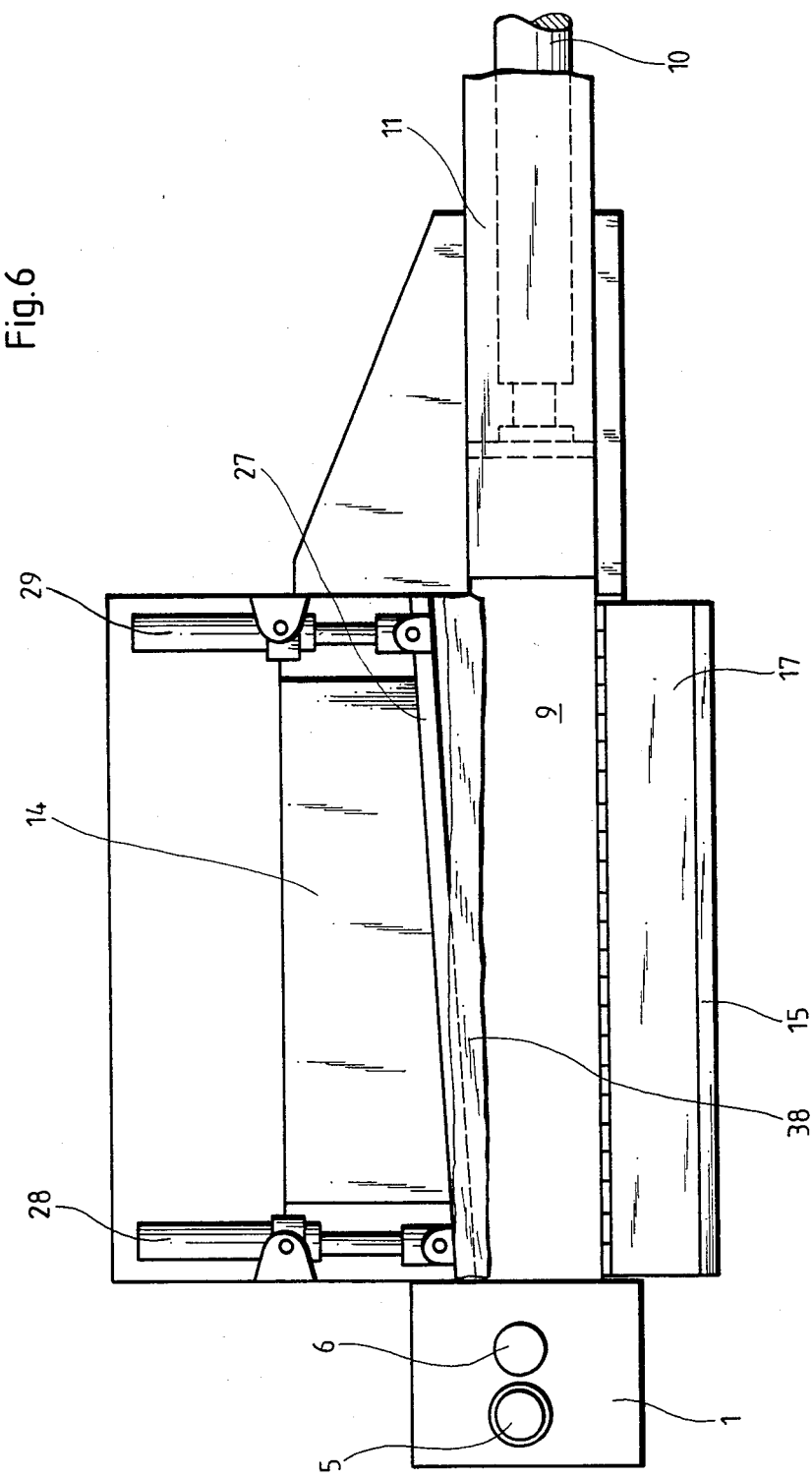
FIG. 6 is a plan view of a scrap cutter with a side pressure ram.
Figure 7:
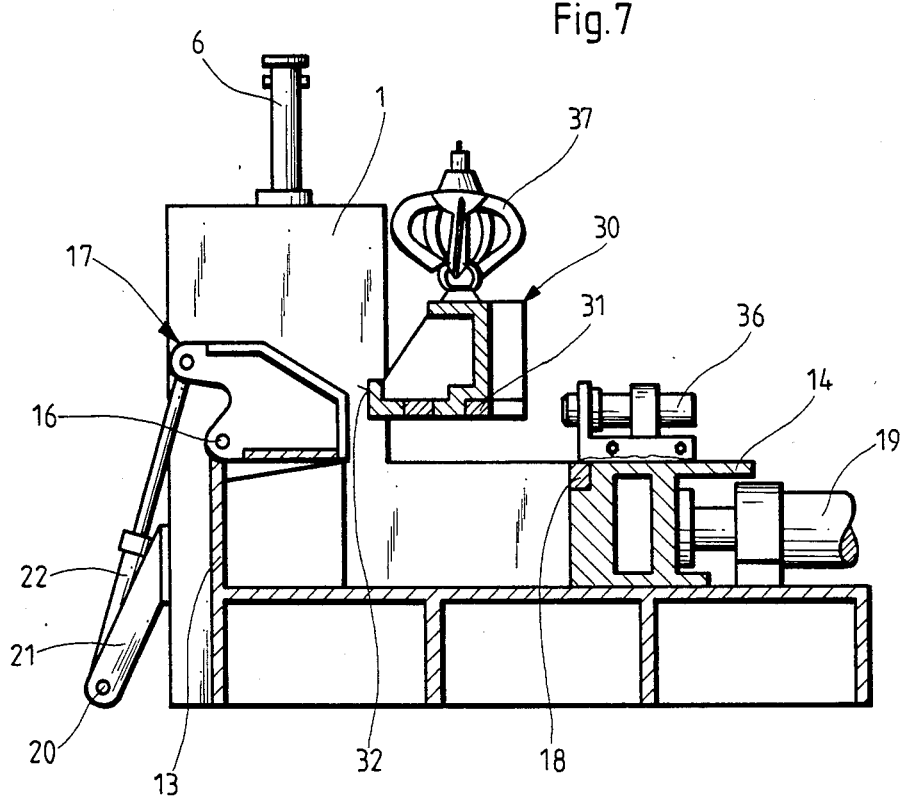
FIG. 7 is a cross-sectional view, similar to FIGS. 2 and 3, of a scrap cutter with an insertable knife carrier.
Figure 8:
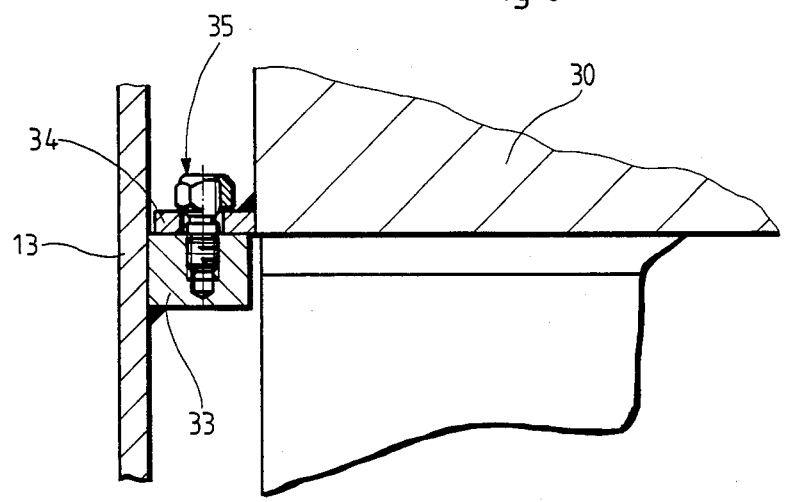
FIG. 8 is an enlarged sectional view taken along the line VIII—VIII in FIG. 11 with an attachment for the support of the knife carrier illustrated in FIG. 7.
Figure 9:
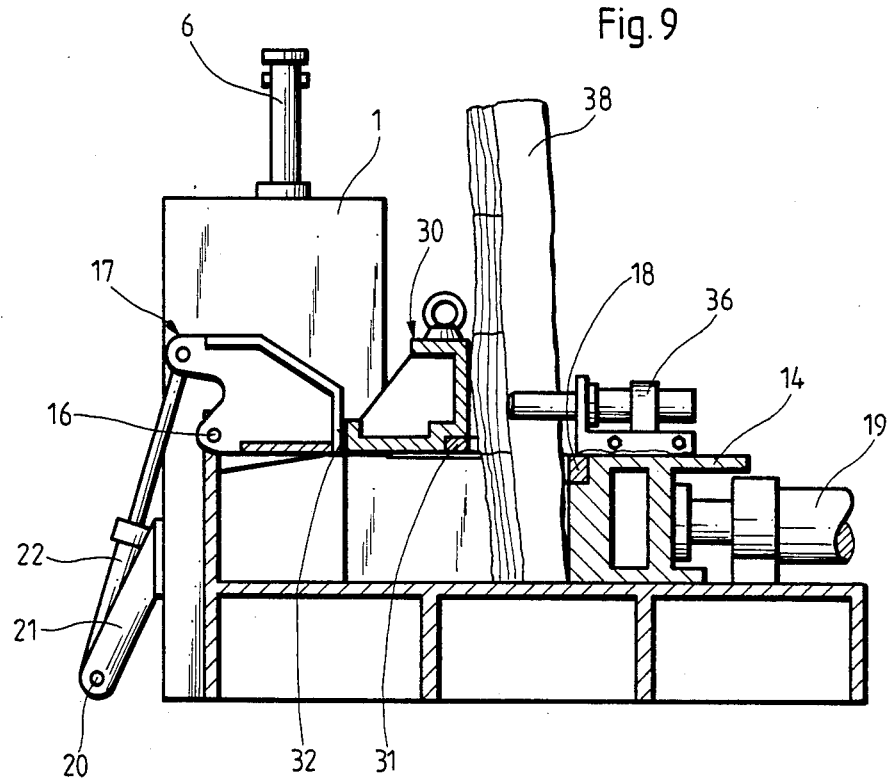
FIG. 9 is a cross-sectional view similar to FIG. 7 with the knife carrier located in the cutting position.
Figure 10:
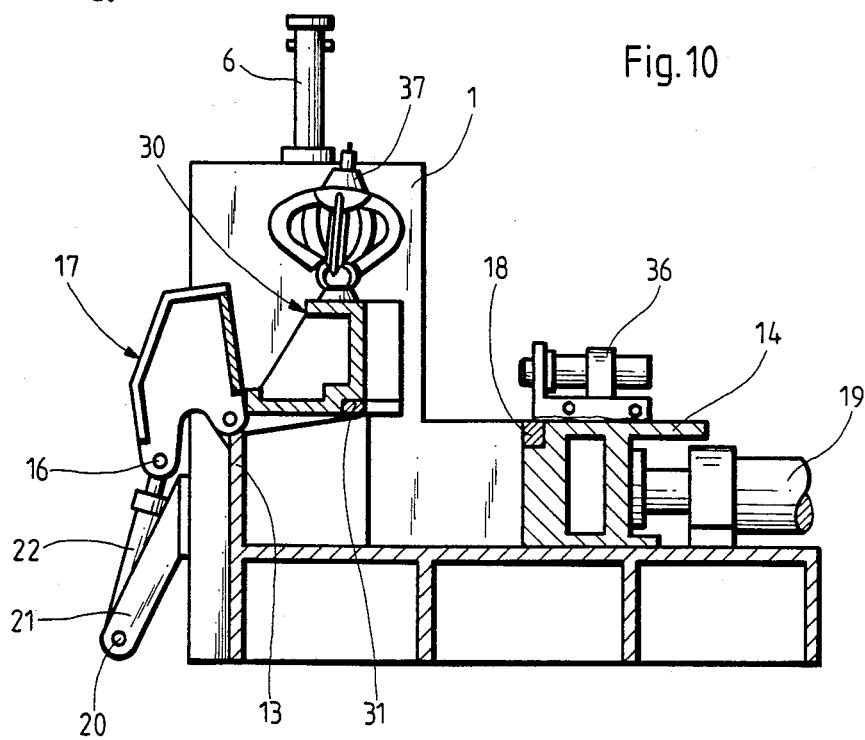
FIG. 10 is a cross-sectional view similar to FIG. 9, however, displaying the knife carrier in a different cutting position.

In the embodiment set forth in FIG. 6, a large-sized scrap material knife 27 is located along the edge of the side pressure ram 26 and can be adjusted obliquely relative to the ram by hydraulic cylinders 28, 29 each located at an opposite end of the knife. In FIGS. 7 to 11, another scrap cutter embodying the present invention is displayed with a separate carrier 30 for an obliquely arranged large-sized scrap material knife 31. At its opposite side from the knife 31, the carrier 30 has an abutment edge 32 which bears against either the trough cover 17 (FIG. 9) in the pivoted-down position, or against the longitudinal side wall 13 (FIG. 10) of the feed trough 9. To hold the knife carrier 30 in the cutting position, a support member 33 is provided at the side wall 13 of the trough. A bracket 34 secured to the carrier 30 rests on the support member 33 in the cutting position, and it is secured in this position by bolts 35. Moreover, in the cutter embodiment depicted in FIGS. 7 to 11, clamping cylinders 36 for holding the large-sized scrap material during the cutting operation are mounted on the side pressure ram 14.

It is advisable to use the separate knife carrier 30 if the supply of large-sized scrap material is very small and the scrap cutter is used primarily for small-sized scrap material. In such an arrangement, it is advantageous if the stationary oblique knife 31 on the carrier can be removed, since under certain conditions, it can exert an interfering action.

Figure 3:
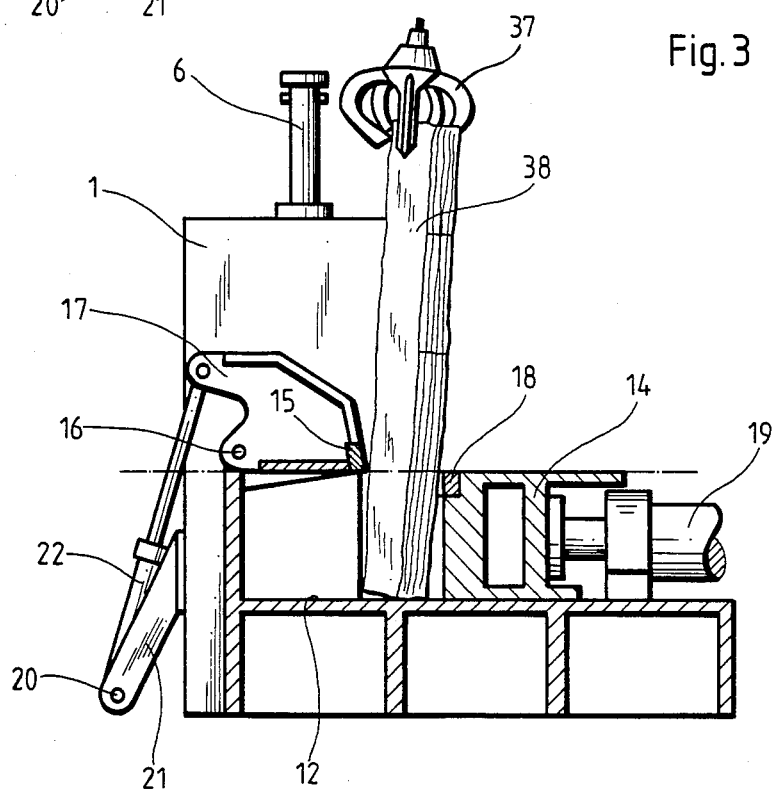
FIG. 3 is a cross-sectional view, similar to FIG. 2, showing the cutter in position for cutting large-sized scrap material.
Figure 4:
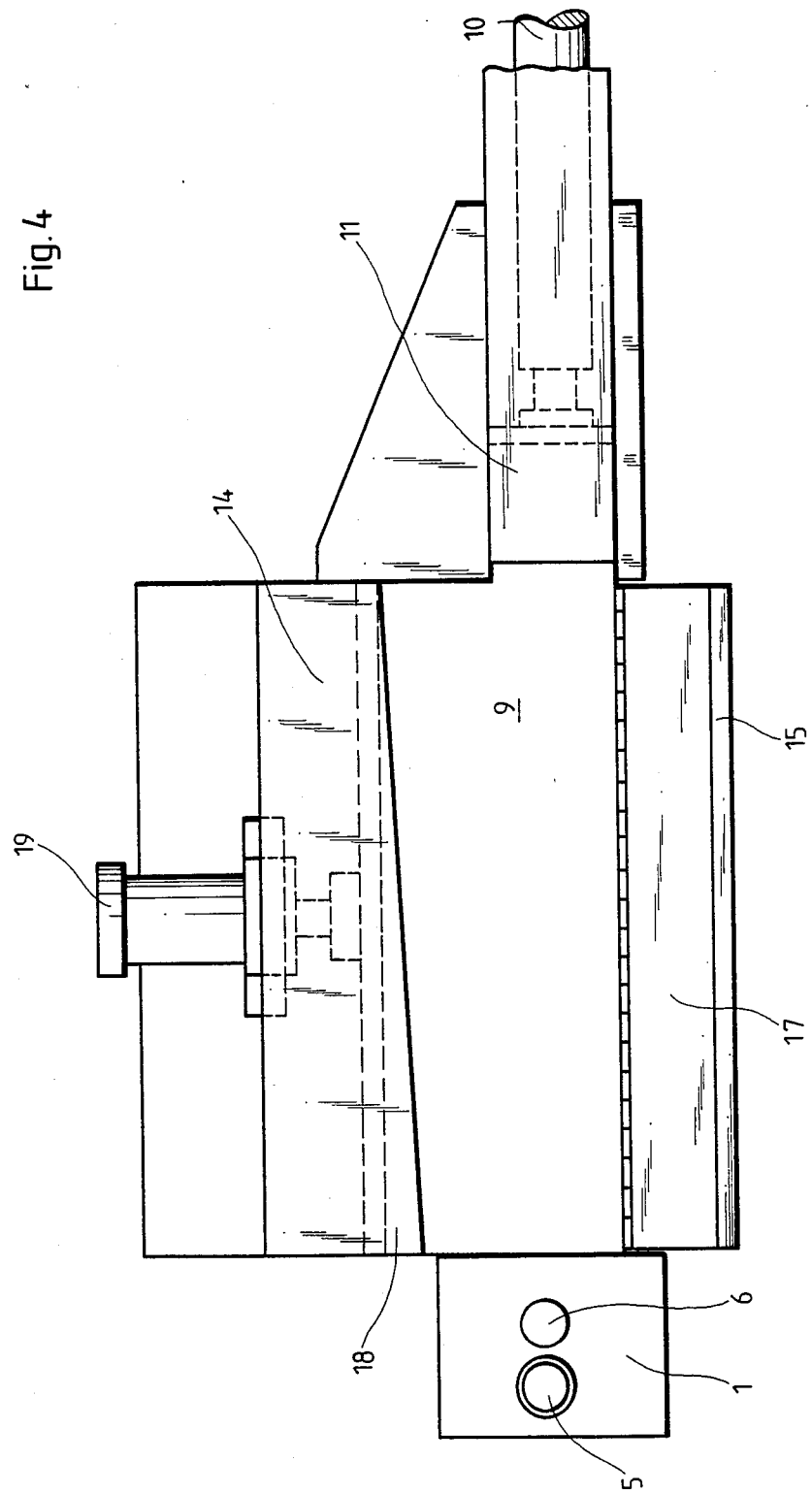
FIG. 4 is a plan view of the cutter shown in FIG. 1 with the cover in the open position.

The operation of the scrap material cutter embodying the present invention can be carried out in the following manner. Initially a large-sized scrap material section 38 is carried out by a crane grapple 37 into the opening between the large-sized scrap material knives 15, 18 with the trough cover 17 in the pivoted-down position and with the side pressure ram displaced outwardly from the trough. The section 38 is rested on the bottom 12 of the trough, as shown in FIG. 3. Next, the side pressure ram is moved toward the trough until the knife 18 contacts the large-sized scrap material section 38 at the end near the primary knives 3, 7 located at the downstream end of the feed trough 9. The knife 18 then commences to cut the section 38 in cooperation with the counterknife 15 so that the cutting takes place in a progressive manner due to the oblique arrangement of the knife 18 relative to the knife 15. As a result, a portion of the section 38 is sheared off and falls on the bottom 12 of the trough and can be pushed by the conveyor slide 11 toward the opening formed by the cooperating knives 3, 7 at the downstream or head end of the feed trough 9. After a portion of the large-sized scrap material section 38 is cut off, the section 38 is lowered by the crane grapple 37 and the above-described cutting action is repeated until the entire large-sized scrap material section has been cut up.

The individual partial sections can be compacted in the feed trough 9 by the side pressure ram 14 operating transversely of the long direction of the trough. In carrying out such a compacting action, however, it is necessary, in the embodiment shown in FIGS. 5 and 6, initially to adjust the obliquely extending movable large-sized scrap material knife 27 so that it extends parallel to the long direction of the trough or the elongated side wall of the trough by means of the knife actuator 25 or 28, 29.

The various embodiments of the invention illustrate how it is possible with the scrap cutter of the present invention to cut up large-sized scrap material which can then be compacted similar to small-sized scrap material and cut up in an operation along with the small-sized scrap material. The structural requirement for this cutter is exceedingly small and essentially involves the two additional large-sized scrap material knives integrated into a conventional scrap material cutter and, in actual operation, requires only certain adjustments.

While specific embodiments of the invention have been shown and described in detail to illustrate the application of the inventive principles, it will be understood that the invention may be embodied otherwise without departing from such principles.

We claim:

1. In a device for cutting large-sized, difficult to compact scrap material and small-sized scrap material comprising first knives for cutting the scrap material, a horizontally extending feed trough having an upper side and a lower side and extending transversely from said first knives, said feed trough including an upwardly extending wall acting as a side pressure ram displaceable across said feed trough, and a cover at least partially covering the upper side of said feed trough, wherein the improvement comprises means for forming at least two second knives extending along said feed trough and being movable relative to one another for cutting without compacting large-sized, difficult to compact scrap material placed downwardly into the feed trough from the upper side thereof, and at least one of said second knives is arranged to extend obliquely to the other said second knife so that a progressive cut is effected on the side of the side pressure ram of the feed trough when said second knives are moved toward one another, both said second knives being in cutting position when the large-sized uncompacted scrap material has been placed in the feed trough.

2. In a device for cutting large-sized, difficult to compact scrap material and small-sized scrap material comprising first knives for cutting the scrap material, a horizontally extending elongated feed trough having an upper side and a lower side and extending transversely of said first knives and being elongated in the direction extending transversely of the first knives, said feed trough including an upwardly extending wall extending in the elongated direction of said feed trough and acting as a slde pressure ram displaceable across said feed trough, and a cover located opposite said upwardly extending wall extending in the elongated direction of said feed trough and at least partially covering the upper side of said feed trough, wherein the improvement comprises means for forming at least two second knives located adjacent said first knives and extending in the elongated direction of and along said feed trough and being movable relative to one transversely of the elongated direction of said feed trough for cutting without compacting large-sized, difficult to compact scrap material placed downwardly into the feed trough the upper side thereof, and at least one of said second knives is arranged to extend obliquely to the other said second knife and both second knives being in cutting position when the large-sized uncompacted scrap material has been placed in the feed trough so that a progressive cut is effected when said second knives are moved toward one another, said first knives being arranged to cut in a vertical plane and said second knives being arranged to cut in a horizontal plane so that horizontally extending elongated cuts of large-sized scrap material can be cut by said second knives with the cut scrap material located within the feed trough and then the cut large-sized scrap material can be moved within the feed trough toward the first knives to be cut vertically.

3. A device, as set fourth in claim 1 or 2, wherein said second knives comprise a movable second knife secured to said side pressure ram and a stationary second knife secured to said cover.

4. A device, as set forth in claims 1 or 2, wherein a second knife carrier is separate from said cover and is supportable on the upper side of said feed trough, said second knives comprise a movable second knife secured to said side pressure ram and a stationary second knife secured to said second knife carrier.

5. A device, as set forth in claim 4, wherein means are provided on said knife carrier and said trough for supporting said knife carrier on said trough.

6. A device, as set forth in claim 5, wherein said knife carrier has a knife edge for supporting one of said second knives and an oppositely disposed edge along which said means are located for supporting said carrier on said trough.

7. A device, as set forth in claim 1 or 2, wherein means are arranged for adjusting the oblique position of said at least one of said second knives relative to the other said second knife.

8. A device, as set forth in claim 7, including a pivot axis for said adjustable second knife, and a pivot actuator secured to said adjustable second knife at a position spaced from said pivot axis for adjustably positioning said adjustable second knife about said pivot axis.

9. A device, as set forth in claim 1 or 2, wherein said cover is movably displaceable.

10. A device, as set forth in claim 9, wherein said cover is horizontally displaceable.

11. A device, as set forth in claim 9, wherein said cover is pivotally displaceable about an axis extending parallel to the elongated direction of said feed trough.

12. A device, as set forth in claim 1 or 2, wherein said side pressure ram is angularly adjustable relative to the elongated direction of said feed trough.

13. A device, as set forth in claim 1 or 2, wherein at least one clamping cylinder is mounted on said side pressure ram for holding the large-sized scrap material during the cutting thereof.

14. A device, as set forth in claim 1 or 2, wherein a conveyor slide is located in said feed trough and is displaceable in direction of said feed trough for moving scrap material introduced into said feed trough toward said first knives.

* * * * *